(12) United States Patent
Estridge et al.

(10) Patent No.: US 7,503,179 B2
(45) Date of Patent: Mar. 17, 2009

(54) SYSTEM AND METHOD TO EXHAUST SPENT COOLING AIR OF GAS TURBINE ENGINE ACTIVE CLEARANCE CONTROL

(75) Inventors: Scott Anthony Estridge, Cincinnati, OH (US); Roger Francis Wartner, Hamilton, OH (US); Michael Terry Bucaro, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/303,305

(22) Filed: Dec. 16, 2005

(65) Prior Publication Data

US 2007/0140838 A1    Jun. 21, 2007

(51) Int. Cl.
*F02C 6/08* (2006.01)
(52) U.S. Cl. ............................ 60/782; 60/806; 415/108; 415/115
(58) Field of Classification Search .................. 60/782, 60/799, 806, 39.75; 415/173.1–173.3, 175–178, 415/114–117, 108, 134–136, 213; 285/41, 285/62; 403/28, 388, 408.1; 165/81–82, 165/169
See application file for complete search history.

(56) References Cited

U.S. PATENT DOCUMENTS

| | | | |
|---|---|---|---|
| 4,765,742 A | 8/1988 | Davinson | |
| 4,804,905 A | 2/1989 | Ding et al. | |
| 4,826,397 A | 5/1989 | Shook et al. | |
| 5,100,291 A | 3/1992 | Glover | |
| 5,205,115 A | 4/1993 | Plemmons et al. | |
| 5,205,708 A * | 4/1993 | Plemmons et al. | 415/173.1 |
| 5,219,268 A | 6/1993 | Johnson | |
| 5,281,085 A | 1/1994 | Lenahan et al. | |
| 5,399,066 A | 3/1995 | Glover | |
| 6,035,929 A | 3/2000 | Friedel et al. | |
| 6,152,685 A | 11/2000 | Hagi | |
| 6,185,925 B1 | 2/2001 | Proctor et al. | |
| 6,454,529 B1 * | 9/2002 | Zearbaugh et al. | 415/173.2 |
| 6,464,457 B1 | 10/2002 | Morgan et al. | |
| 6,902,371 B2 | 6/2005 | Anderson, Jr. et al. | |
| 6,949,939 B2 | 9/2005 | Kirzhner | |

(Continued)

OTHER PUBLICATIONS

European Search Report, EP 06 12 6126, Jan. 24, 2008, 6 pages.

*Primary Examiner*—William H Rodriguez
*Assistant Examiner*—Phutthiwat Wongwian
(74) *Attorney, Agent, or Firm*—William Scott Andes; Steven J. Rosen

(57) ABSTRACT

An exemplary thermal air exhaust system includes circumferentially extending exhaust passages to exhaust thermal control air from an annular region between an outer casing and a distribution manifold encircling an axially extending portion of the casing after the thermal control air has been sprayed on at least one thermal control ring attached to the outer casing and/or onto the outer casing by spray tubes with spray holes. Baffles attached to base panels of the distribution manifold and contoured to form the exhaust passages between the baffles and base panels. The exhaust passages having exhaust passage inlets formed by radially facing exhaust holes through the baffles and exhaust passage outlets formed by circumferentially facing exhaust passage outlets between the baffles and the base panels. Thermal control air is sprayed on at least one thermal control ring and/or onto the outer casing and then circumferentially exhausted through the exhaust passages.

20 Claims, 11 Drawing Sheets

U.S. PATENT DOCUMENTS 7,287,955 B2 10/2007 Amiot et al.
7,309,209 B2 12/2007 Amiot et al.
2002/0053837 A1* 5/2002 Arilla et al. .................. 310/58
2007/0140839 A1* 6/2007 Bucaro et al. ............... 415/178
2007/0264120 A1 11/2007 Amiot et al.

* cited by examiner

SYSTEM AND METHOD TO EXHAUST SPENT COOLING AIR OF GAS TURBINE ENGINE ACTIVE CLEARANCE CONTROL

BACKGROUND OF THE INVENTION

Field of the Invention

This invention relates to thermal control of gas turbine engine rings such as flanges as might be found in active clearance control apparatus and, more particularly, to apparatus and method for exhausting thermal control fluid after it has been impinged on gas turbine engine rings and/or flanges.

Engine performance parameters such as thrust, specific fuel consumption (SFC), and exhaust gas temperature (EGT) margin are strongly dependent upon clearances between turbine blade tips and static seals or shrouds surrounding the blade tips. Active clearance control is a well known method to modulate a flow of cool or relatively hot air, generally referred to as thermal control air, from the engine fan and/or compressor and spray it on high and low pressure turbine casings to shrink the casings relative to the high and low pressure turbine blade tips under steady state, high altitude cruise conditions. The air may be flowed to or sprayed or impinged on other static structures used to support the shrouds or seals around the blade tips such as flanges or pseudo-flanges which function as thermal control rings. The spent thermal control air can build up within an annular region between the outer casing being cooled and a distribution manifold used to supply and impinge the cooling air on the thermal control rings. It is highly desirable to be able to increase heat transfer between the thermal control air and the thermal control rings as compared to previous designs and, thus, make more efficient use of the thermal control air. Thus it is desirable to provide a steady flow of the thermal control air to be impinged on thermal control rings and wash radially outwardly along the entirety of the thermal control rings.

SUMMARY OF THE INVENTION

A thermal air exhaust system includes circumferentially extending exhaust passages to circumferentially exhaust thermal control air from an annular region between an outer casing and a distribution manifold encircling an axially extending portion of the outer casing after the thermal control air has been sprayed on at least one thermal control ring attached to the outer casing and/or onto the outer casing by spray tubes with spray holes. An exemplary embodiment of the thermal air exhaust system further includes baffles attached to base panels of the distribution manifold and contoured to form the exhaust passages between the baffles and the base panels through which the thermal control air is exhausted from an annular region. The exhaust passages have exhaust passage inlets formed by radially facing exhaust holes through the baffles and circumferentially facing exhaust passage outlets between the baffles and the base panels.

A gas turbine engine thermal control apparatus further includes the manifold having an annular supply tube connected in fluid supply relationship to a plurality of plenums of a plurality of header assemblies and a plurality of annular spray tubes connected in fluid supply relationship to at least one of the plurality of plenums. The spray tubes have spray holes oriented to impinge thermal control air onto an outer casing and/or onto at least one thermal control ring attached to the outer casing. An annular segmented stator shroud is attached to the outer casing and the shroud circumscribes radial outer blade tips of turbine blades of a turbine rotor. A more particular embodiment of the thermal control apparatus includes at least two thermal control rings attached to the outer casing and the circumferentially extending exhaust passages operable to circumferentially exhaust the thermal control air from an annular region between the outer casing and the manifold after the thermal control air has been sprayed by the spray tubes.

A method for exhausting thermal control air includes spraying thermal control air on at least one thermal control ring attached to an outer casing and/or onto the outer casing with spray tubes having spray holes in an annular region between the outer casing and a distribution manifold encircling an axially extending portion of the casing and then circumferentially exhausting the thermal control air through circumferentially extending exhaust passages. An exemplary embodiment of the method further includes flowing the thermal control air through exhaust passages, during the circumferentially exhausting of the thermal control air. The exhaust passages being formed between baffles attached to base panels of the distribution manifold and contoured to form the exhaust passages between the baffles and the base panels. The flowing of the thermal control air through exhaust passages further includes flowing the thermal control air into the exhaust passages through exhaust passage inlets of the exhaust passages formed by radially facing exhaust holes through the baffles, then flowing the thermal control air through the exhaust passages, and then flowing the thermal control air out of the exhaust passages through circumferentially facing exhaust passage outlets between the baffles and the base panels.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
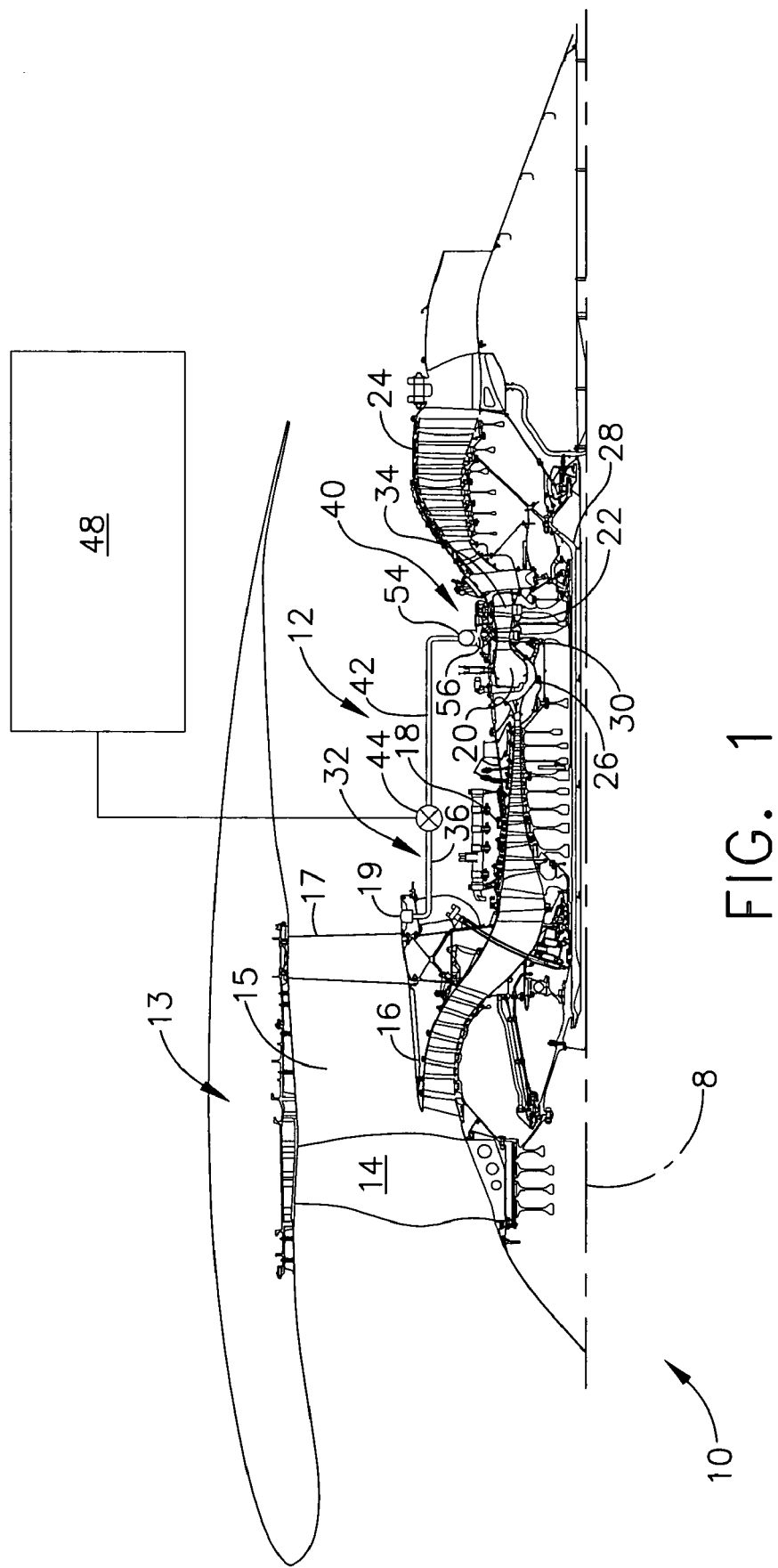
FIG. 1 is a schematical cross-sectional view illustration of an aircraft gas turbine engine with an active clearance control system including annular spray tubes having spray holes oriented to impinge thermal control air onto a fillet between a casing and a thermal control ring.

Schematically illustrated in cross-section in FIG. 1 is an exemplary embodiment of an aircraft gas turbine engine 10 including an active clearance control system 12. The engine 10 has, in downstream serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26 disposed about an engine axis 8 drivingly connects the HPT 22 to the HPC 18 and a low pressure shaft 28 drivingly connects the LPT 24 to the LPC 16 and the fan 14. The HPT 22 includes an HPT rotor 30 having turbine blades 34 mounted at a periphery of the rotor 30.

Figure 2:
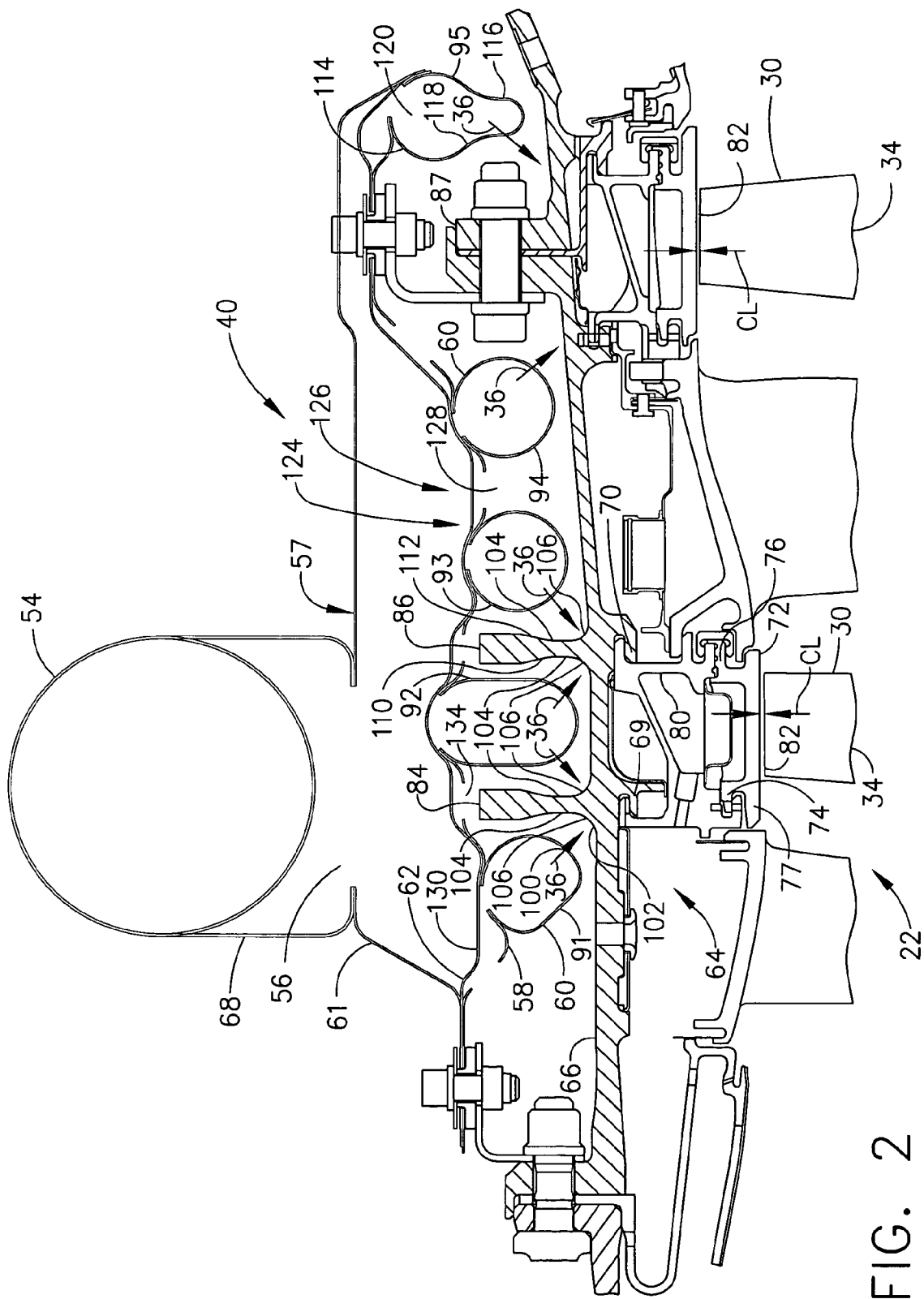
FIG. 2 is a schematical cross-sectional view illustration of a header assembly illustrated in FIG. 1.

A compressed fan air supply 32 is used as a source for thermal control air 36 which is supplied to a turbine blade tip clearance control apparatus generally shown at 40 through an axial air supply tube 42. An air valve 44 disposed in the air supply tube 42 controls the amount of thermal control air flowed therethrough. The thermal control air 36 is cooling air in the exemplary embodiment of the active clearance control system 12 illustrated herein. The cooling air is controllably flowed from a fan bypass duct 15 surrounding the booster or low pressure compressor (LPC) 16 through the axial air supply tube 42 to a distribution manifold 50 of the turbine blade clearance control apparatus 40. The air valve 44 and the amount of thermal control air 36 impinged for controlling turbine blade tip clearances CL, illustrated in FIG. 2, is controlled by the controller 48. The controller 48 is a digital electronic engine control system often referred to as a Full Authority Digital Electronic Control (FADEC) and controls the amount and temperature if so desired of the thermal control air 36 impinged on forward and aft thermal control rings 84 and 86 and, thus, to control the turbine blade tip clearance CL.

An air supply inlet 19 to the axial air supply tube 42 is located downstream of exit guide vanes 17 disposed in the fan bypass duct 15 downstream of the fan 14. The distribution manifold 50 encircles a portion of the high pressure turbine 22. The manifold 50 includes an annular supply tube 54 which distributes the cooling air to a plurality of plenums 56 of a plurality of header assemblies 57 from which the cooling air is distributed to a plurality of annular spray tubes 60 circumscribed about the engine axis 8 as illustrated in FIGS. 2 and 3.

Figure 3:
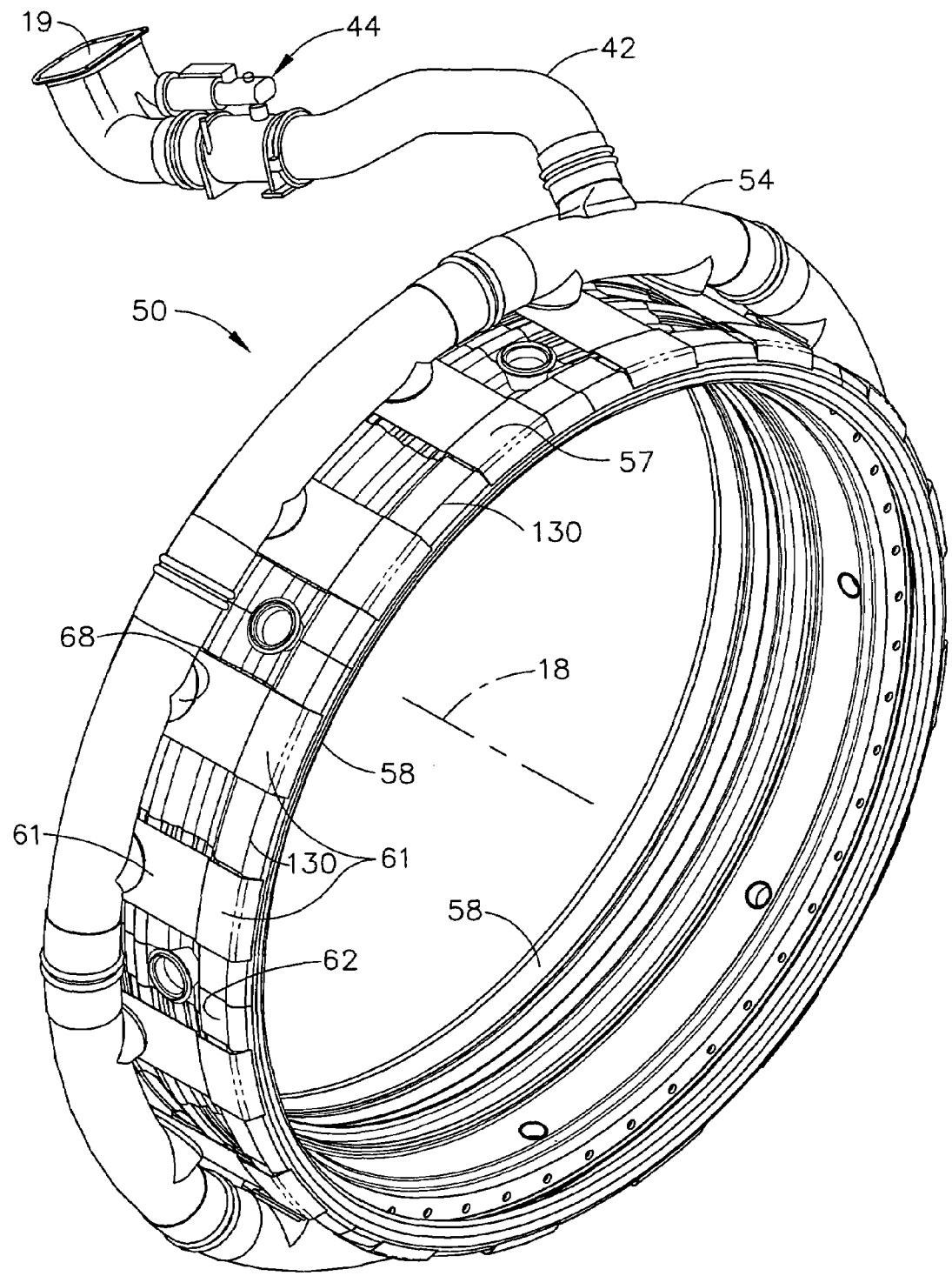
FIG. 3 is a perspective view illustration of a thermal air distribution manifold of the active clearance control system illustrated in FIG. 1 including header assemblies one of which is illustrated in FIG. 2.
Figure 4:
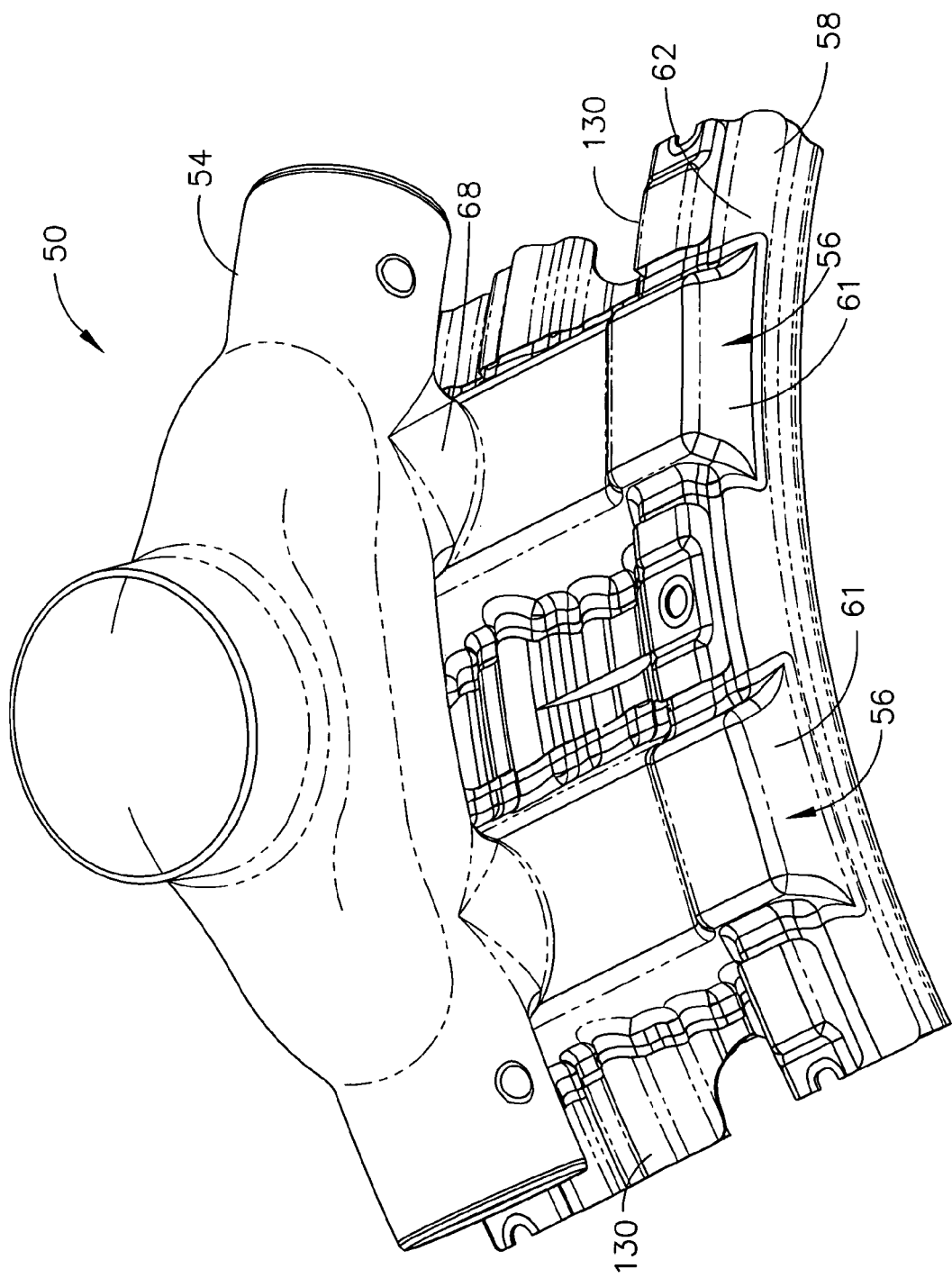
FIG. 4 is a perspective view illustration of the header assembly illustrated in FIG. 2.
Figure 5:
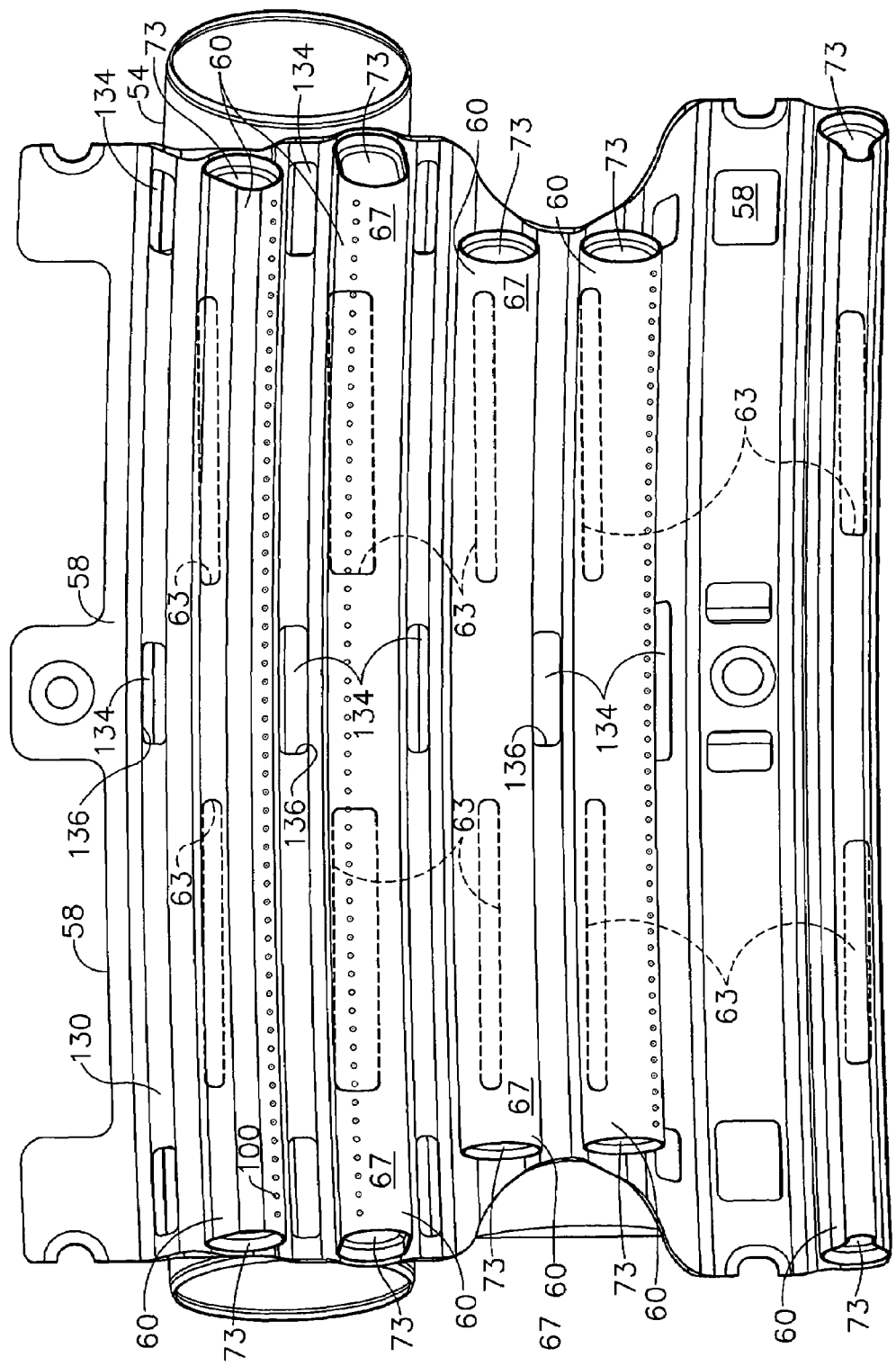
FIG. 5 is a radially outwardly looking perspective view illustration of a portion of the thermal air distribution manifold and header assembly illustrated in FIGS. 2 and 3.
Figure 6:
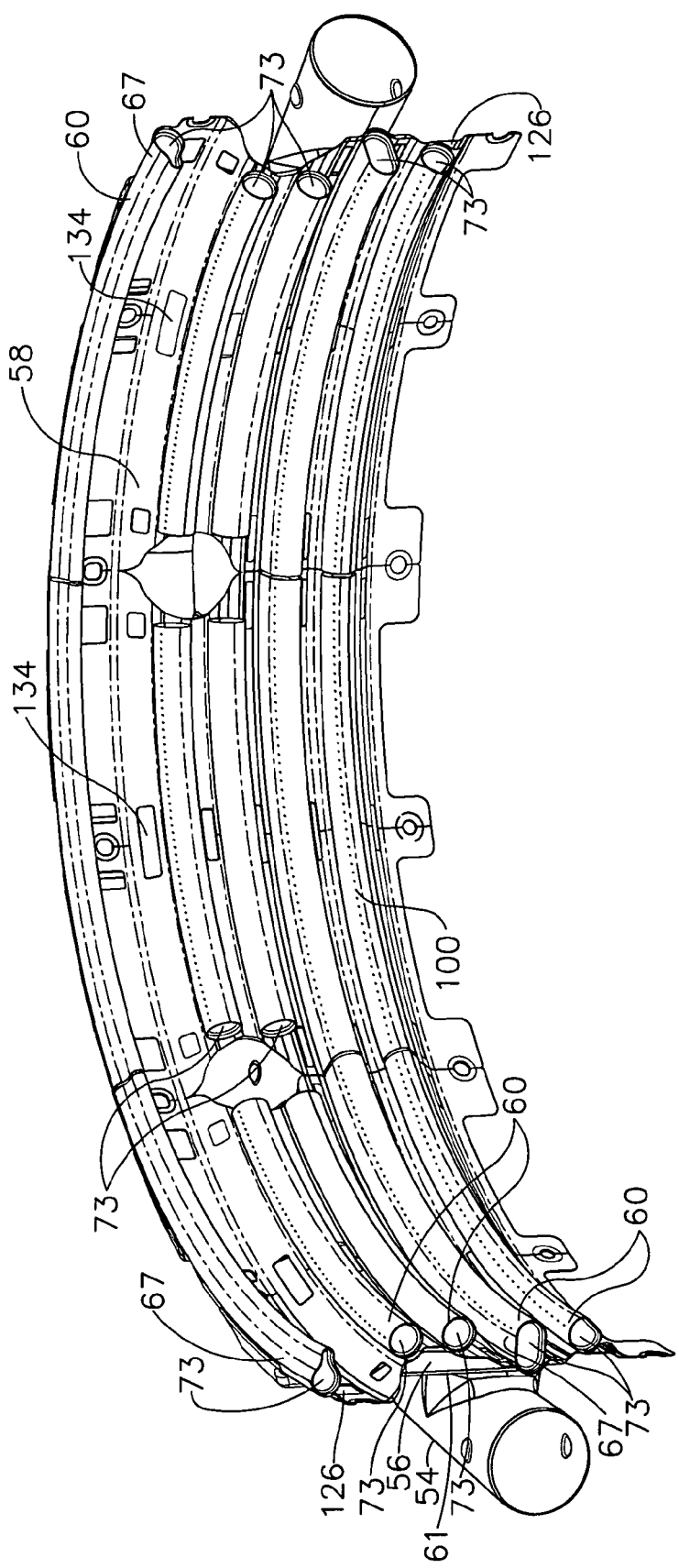
FIG. 6 is a radially outwardly looking perspective view illustration of a larger portion of the thermal air distribution manifold illustrated in FIG. 5.
Figure 7:
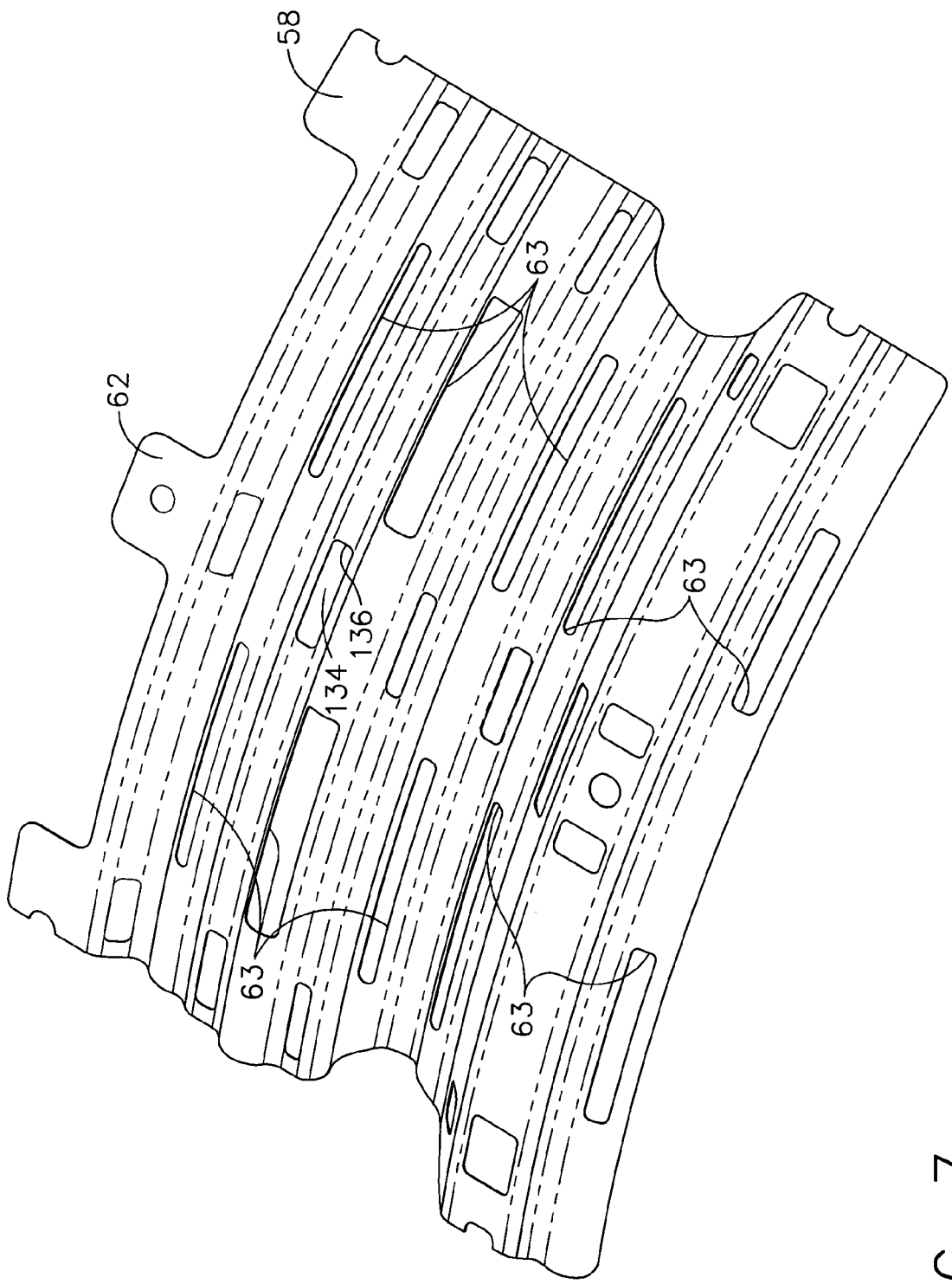
FIG. 7 is a radially inwardly looking perspective view illustration of a base panel of the header assembly illustrated in FIG. 5.
Figure 8:
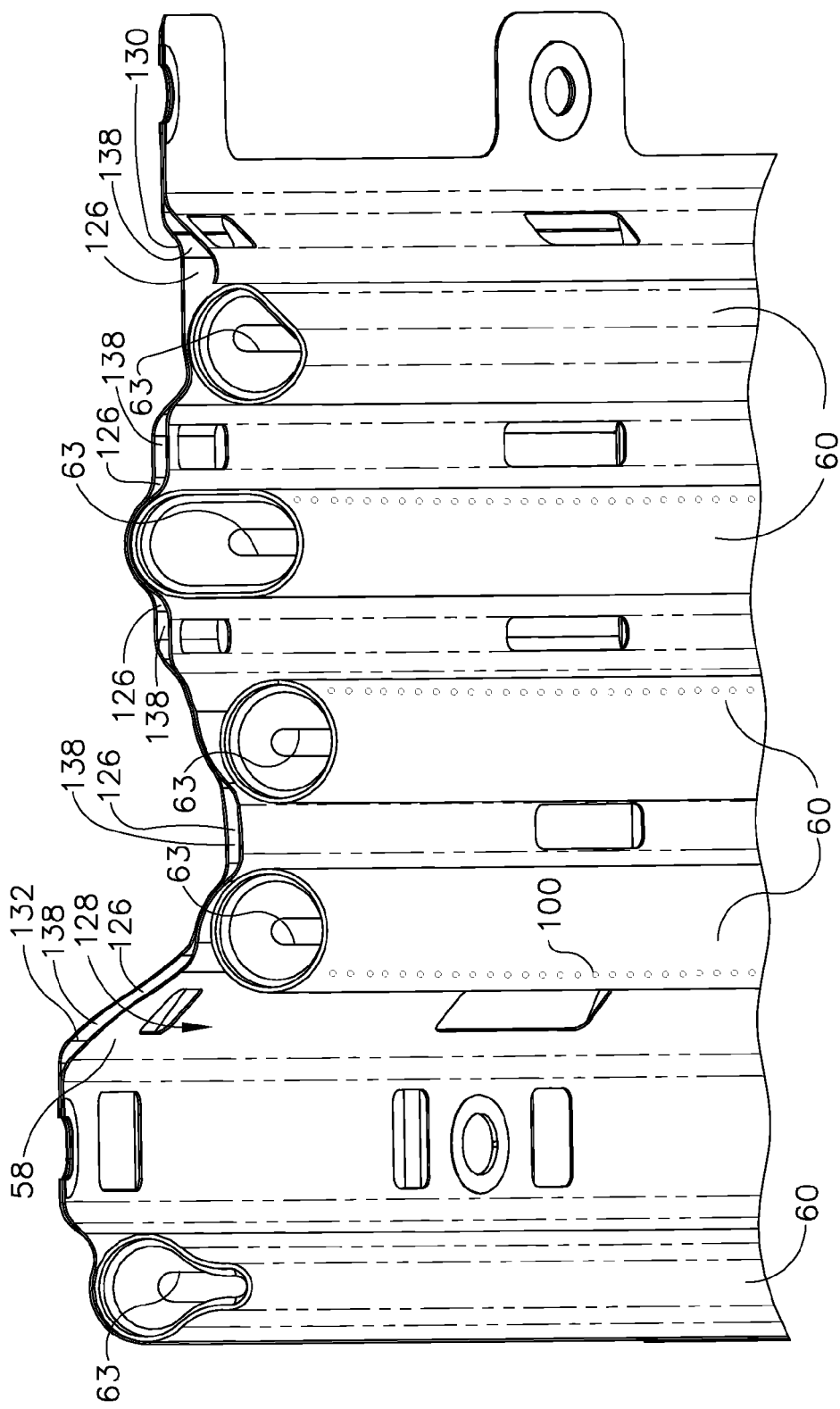
FIG. 8 is an enlarged radially outwardly looking perspective view illustration of the base panel and spray tubes of the header assembly illustrated in FIG. 5.
Figure 9:
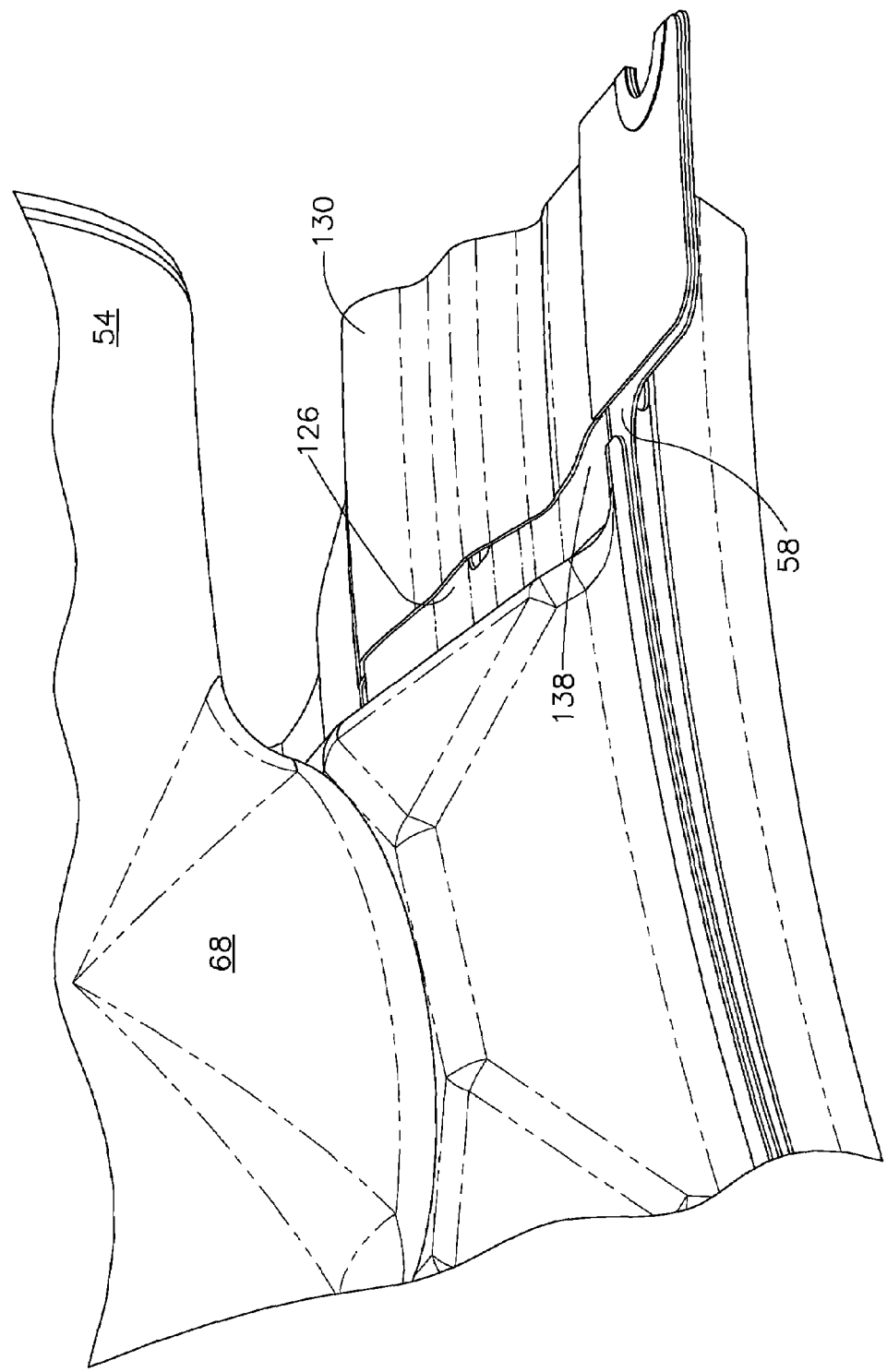
FIG. 9 is an enlarged radially inwardly looking perspective view illustration of an exhaust passage between a baffle and the base panel and exhaust passage of the header assembly illustrated in FIG. 5.
Figure 10:
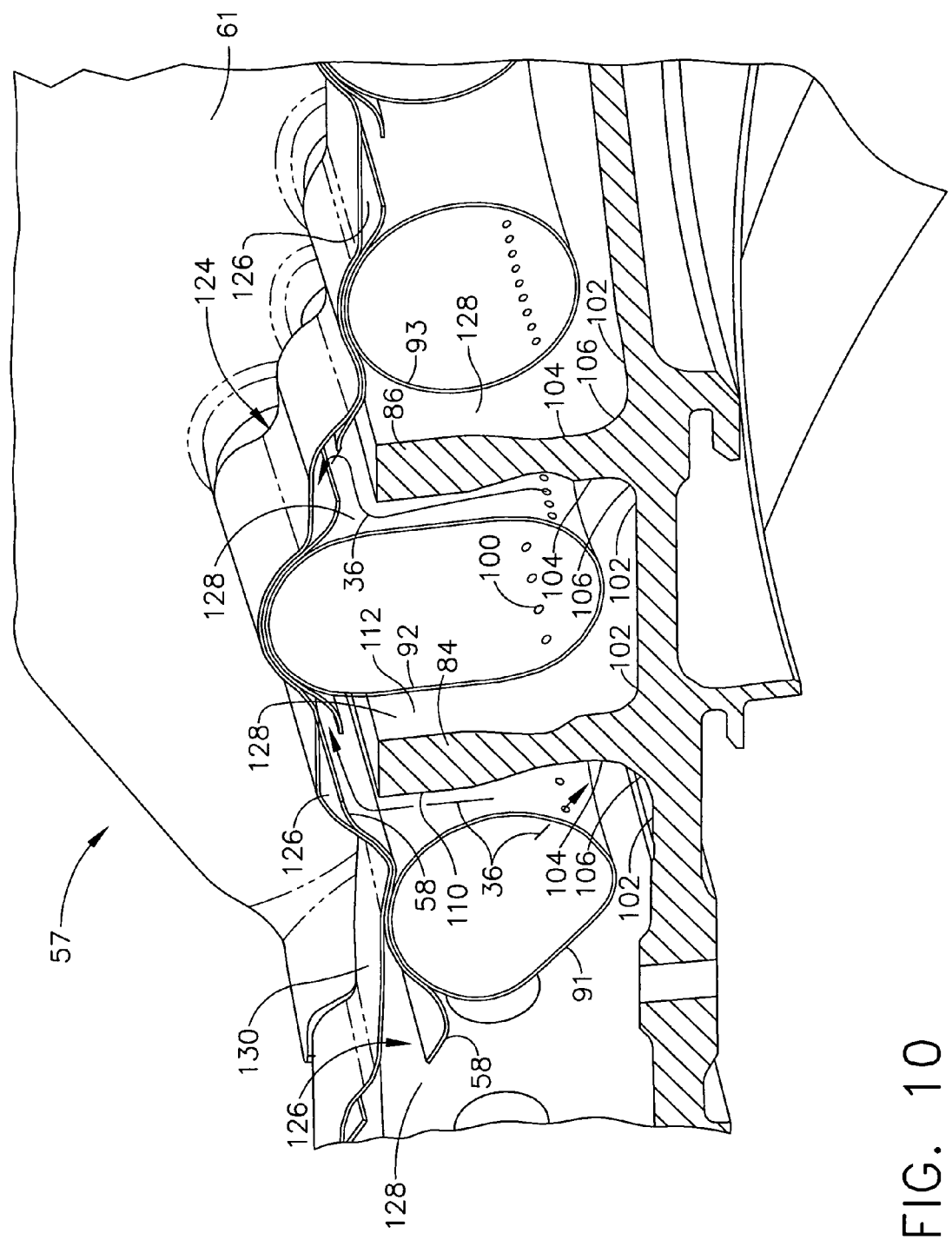
FIG. 10 is a cut away radially inwardly looking perspective view illustration of the spray tubes of the header assembly illustrated in FIGS. 4 and 5.

Referring to FIGS. 3 and 4, two of the plenums 56 are located in each one of the plurality of header assemblies 57 circumferentially positioned around the HPT 22. Each of the header assemblies 57 include a base panel 58, illustrated more particularly in FIGS. 2 and 7, with circumferentially spaced apart dual box-shaped headers 61 brazed or otherwise attached to a radially outer side 62 of the base panel 58 as illustrated in FIGS. 5, 6, and 8. The plenums 56 are formed between the headers 61 and the base panel 58. Each of the headers 61 is connected to the supply tube 54 by a T-fitting 68. First elongated panel holes 63 are disposed through the base panel 58, as illustrated in FIG. 7, allowing the cooling air to flow from the plenums 56 to the plurality of spray tubes 60 as illustrated in FIGS. 5 and 2. The spray tubes 60 are segmented to form arcuate segments attached to the base panel 58 which is part of the header assembly 57. The spray tubes 60 are closed and sealed at their circumferential ends 67 with caps 73.

Illustrated in FIG. 2 is a first turbine stator assembly 64 attached to a radially outer casing 66 of the HPT 22 by forward and aft case hooks 69 and 70. The stator assembly 64 includes an annular segmented stator shroud 72 having shroud segments 77 mounted by forward and aft shroud hooks 74 and 76 to an annular segmented shroud support 80 of the first turbine stator assembly 64. The shroud 72 circumscribes turbine blades 34 of the rotor 30 and helps reduce the flow from leaking around a radial outer blade tip 82 of the blade 34. The active clearance control system 12 is used to minimize a radial blade tip clearance CL between the outer blade tip 82 and the shroud 72, particularly during cruise operation of the engine 10.

It is well known in the industry that small turbine blade tip clearances CL provide lower operational specific fuel consumption (SFC) and, thus, large fuel savings. The forward and aft thermal control rings 84 and 86 are provided to more effectively control blade tip clearance CL with a minimal amount of time lag and thermal control (cooling or heating depending on operating conditions) air flow. The forward and aft thermal control rings 84 and 86 are attached to or otherwise associated with the outer casing 66 and may be integral with the respective casing (as illustrated in FIG. 2), bolted to or otherwise fastened to the casing or mechanically isolated from but in sealing engagement with the casing.

The forward and aft thermal control rings 84 and 86 illustrated herein are also referred to as pseudo-flanges. The forward and aft thermal control rings 84 and 86 may also be bolted flanges 87 such as those found at the end of casings. The thermal control rings provide thermal control mass to more effectively move the shroud segments 77 radially inwardly (and outwardly if so designed) to adjust the blade tip clearances CL. The forward and aft case hooks 69 and 70 are located generally radially inwardly of an axially near or at the forward and aft thermal control rings 84 and 86 to improve response to changes in thermal air impinging the control rings.

The plurality of spray tubes 60 are illustrated herein as having first, second, and third spray tubes 91-93 with spray holes 100 oriented to impinge thermal control air 36 (cooling air) onto bases 102 of the forward and aft thermal control rings 84 and 86 to cause the shroud segments 77 to move radially inwardly to tighten up or minimize the blade tip clearances CL. The bases 102 are portions of the fillets 104 between the outer casing 66 and centers 106 of the fillets 104. More particularly, the spray holes 100 are oriented to impinge thermal control air 36 (cooling air) into the centers 106 of the fillets 104 of the forward and aft thermal control rings 84 and 86 to cause the shroud segments 77 to move radially inwardly to tighten up or minimize the blade tip clearances CL. The first spray tube 91 is axially located forward of the forward thermal control ring 84. The second spray tube 92 is axially located between the forward and aft thermal control rings 84 and 86 and has two circular rows 99 of the spray holes 100 oriented to impinge thermal control air 36 into the centers 106 of the fillets 104. The third spray tube 93 is axially located aft of the aft thermal control ring 86.

Impinging thermal control air 36 onto the bases 102 or into centers 102 of the fillets 104 of the thermal control rings provides a more effective use of the thermal control or cooling air as compared to directing the air onto forward and/or aft sides 110, 112 of the thermal control rings and/or onto the outer casing 66, or onto radially outwardly facing sides between the forward and aft sides 110, 112 of the thermal control rings. Impinging thermal control air 36 onto the bases 102 or into centers 106 of the fillets 104 increases heat transfer through the thermal control rings and flanges by allowing the air flow resulting from impinged thermal control air to wash radially outwardly along the entirety of the thermal control rings and/or flanges. The plurality of annular spray tubes 60 are illustrated herein as having fourth and fifth spray tubes 94 and 95 with spray holes 100 oriented to impinge thermal control air 36 on the outer casing 66 near a forward side 110 of the bolted flanges 87.

The first spray tube 91 is elongated radially inwardly from the header assemblies 57 and axially aftwardly towards the fillet 104 of the first thermal control ring. The second spray tube 92 is elongated radially inwardly from the header assemblies 57 towards the outer casing 66. The fifth spray tube 95 is elongated radially inwardly from the header assemblies 57 towards the outer casing 66 and has a generally light bulb cross-sectional shape 120 with a circular radially outer cross-sectional portion 114 connected to a smaller circular radially inner cross-sectional portion 116 by a transition section 118. The radially elongated annular spray tubes are radially inwardly elongated from the header assemblies 57 so that their respective spray holes 100 are better oriented to impinge thermal control air 36 (cooling air) onto or close to the bases 102 of the forward and aft thermal control rings 84 and 86 and the bolted flanges 87 or into the centers 106 of the fillets 104 of the thermal control rings.

The elongated cross-sectional shapes of the impingement tubes enable cooling air to be impinged in close clearance areas where standard tubes would not be able to reach. The elongated cross-section shaped impingement tubes minimize the impingement distance the air has to travel before reaching the thermal control rings. Minimizing the impingement distance causes the thermal air to be more effective because it travels a shorter distance and gains less heat and has a greater jet velocity before impinging on the base of the thermal control ring. This results in greater clearance control between the HPT Blade and Shroud for the same amount of thermal air or cooling flow. Thus, engine SFC is improved and HPT efficiency is increased. It also results in improved capability of maintaining the HPT efficiency during the deterioration of the engine with use, increased time on wing, and improved life of the casing at bolted flanges.

Figure 11:
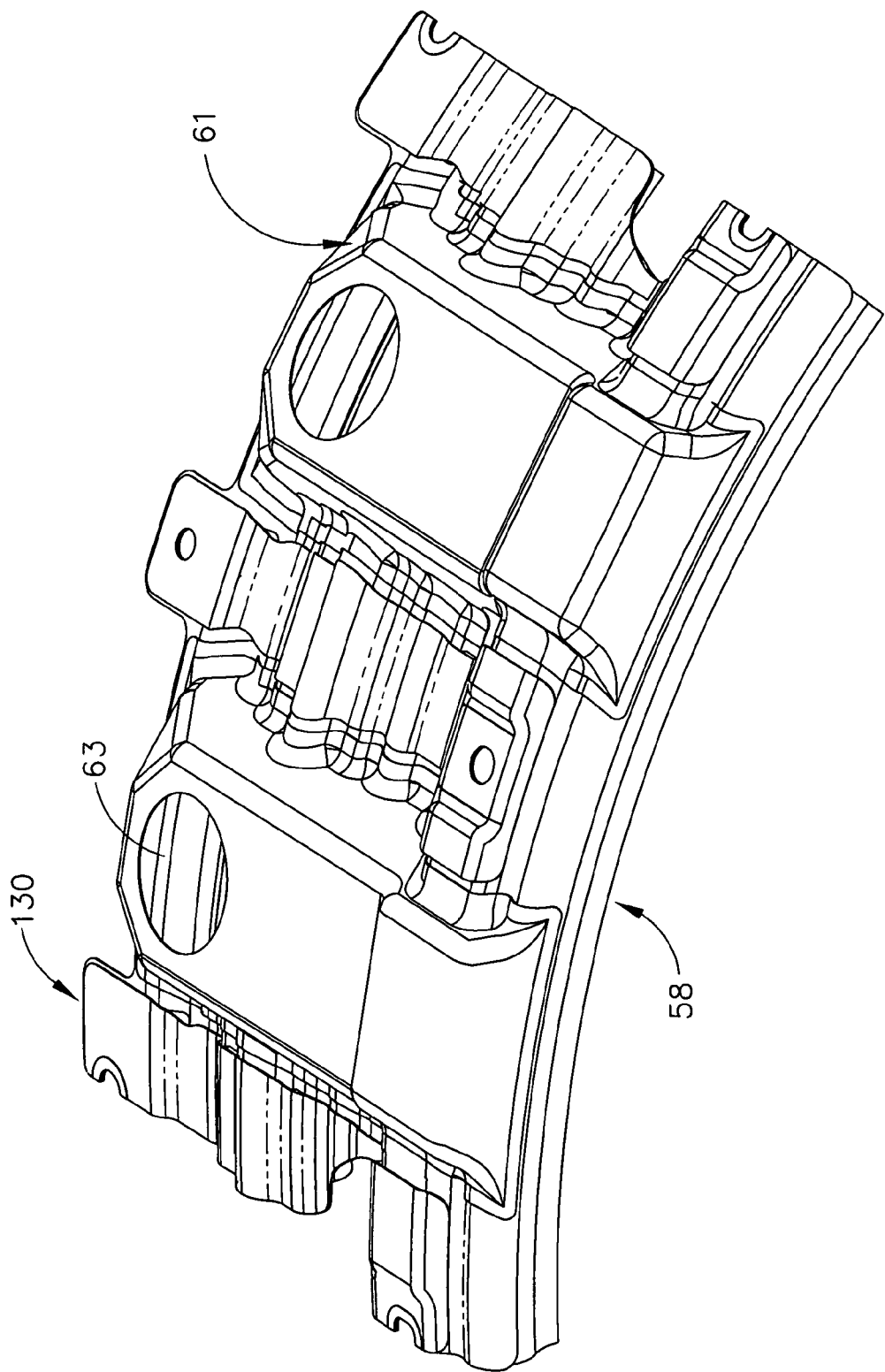
FIG. 11 is an enlarged radially inwardly looking perspective view illustration of box-shaped headers, the baffle, and the base panel of the header assembly illustrated in FIG. 4.

Illustrated in FIGS. 2, 5, 6, and 8-11 is a spent thermal air exhaust system 124 including circumferentially extending exhaust passages 126 to circumferentially exhaust the thermal control air 36 from a generally annular region 128 between the outer casing 66 and the distribution manifold 50 after the thermal control air 36 has been sprayed on the thermal control rings and/or onto the outer casing 66 by the spray tubes 60. Referring to FIGS. 2 and 11, the exhaust passages 126 are illustrated herein as being formed by baffles 130 brazed or otherwise attached to radially outwardly facing surfaces 132 of the base panels 58 of the distribution manifold 50. The baffles 130 are contoured to form the exhaust passages 126 between the baffles 130 and the base panel 58. The exhaust passages 126 have exhaust passage inlets 134 that are formed by generally radially facing exhaust holes 136 through the baffles 130 as illustrated in FIGS. 2, 5 and 7. The exhaust passages 126 have circumferentially facing exhaust passage outlets 138 that are generally circumferentially facing exhaust openings between the baffles 130 and the base panel 58. This arrangement prevents a buildup of spent and either the heated or cooled thermal control air 36 from building up within the annular region 128 between the outer casing 66 and the distribution manifold 50 and allows a steady flow of the thermal control air 36 to be impinged on the forward and aft thermal control rings 84 and 86 and wash radially outwardly along the entirety of the thermal control rings.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A thermal air exhaust system comprising: spray tubes having spray holes operable for spraying thermal control air on at least one thermal control ring attached to an outer casing and/or onto the outer casing, circumferentially extending exhaust passages operable to circumferentially exhaust thermal control air from an annular region between the outer casing and a distribution manifold encircling an axially extending portion of the outer casing, and the circumferentially extending exhaust passages having circumferentially facing exhaust passage outlets operable to exhaust thermal control air from the circumferentially extending exhaust passages.

2. A thermal air exhaust system as claimed in claim 1 further comprising baffles attached to base panels of the distribution manifold and contoured to form the exhaust passages between the baffles and the base panels.

3. A thermal air exhaust system as claimed in claim 2 further comprising the exhaust passages having exhaust passage inlets formed by radially facing exhaust holes through the baffles and the circumferentially facing exhaust passage outlets being formed between the baffles and the base panels.

4. A gas turbine engine thermal control apparatus comprising: a thermal air distribution manifold encircling an axially extending portion of an outer casing, the manifold including an annular supply tube connected in fluid supply relationship to a plurality of plenums of a plurality of header assemblies, a plurality of annular spray tubes connected in fluid supply relationship to at least one of the plurality of plenums, the spray tubes having spray holes oriented to impinge thermal control air onto an outer casing and/or onto at least one thermal control ring attached to the outer casing, and circumferentially extending exhaust passages operable to circumferentially exhaust the thermal control air from an annular region between the outer casing and the manifold, and the circumferentially extending exhaust passages having circumferentially facing exhaust passage outlets operable to exhaust thermal control air from the circumferentially extending exhaust passages.

5. An apparatus as claimed in claim 4 further comprising baffles attached to base panels of the distribution manifold and contoured to form the exhaust passages between the baffles and the base panels.

6. An apparatus as claimed in claim 5 further comprising the exhaust passages having exhaust passage inlets formed by radially facing exhaust holes through the baffles and the circumferentially facing exhaust passage outlets being formed between the baffles and the base panels.

7. An apparatus as claimed in claim 6 further comprising:
the header assemblies including headers attached to radially outer sides of the base panels forming the plenums therebetween,
the headers being connected to the supply tube, first panel holes disposed through the base panels forming inlets for the thermal control air to flow from the plenums to the plurality of spray tubes, and the baffles being brazed or otherwise attached to radially outwardly facing surfaces of the base panels.

8. An apparatus as claimed in claim 7 further comprising an annular segmented stator shroud attached to the outer casing and the shroud circumscribing radial outer blade tips of turbine blades of a turbine rotor.

9. A gas turbine engine thermal control apparatus comprising: a thermal air distribution manifold encircling a portion of an outer casing, the manifold including an annular supply tube connected in fluid supply relationship to a plurality of plenums of a plurality of header assemblies, a plurality of annular spray tubes connected in fluid supply relationship to at least one of the plurality of plenums, the spray tubes having spray holes oriented to impinge thermal control air onto the outer casing and/or onto least two thermal control rings attached to the outer casing, and circumferentially extending exhaust passages operable to circumferentially exhaust the thermal control air from an annular region between the outer casing and the manifold, and the circumferentially extending exhaust passages having circumferentially facing exhaust passage outlets operable to exhaust thermal control air from the circumferentially extending exhaust passages.

10. An apparatus as claimed in claim 9 further comprising baffles attached to base panels of the distribution manifold and contoured to form the exhaust passages between the baffles and the base panels.

11. An apparatus as claimed in claim 10 further comprising the exhaust passages having exhaust passage inlets formed by radially facing exhaust holes through the baffles and the circumferentially facing exhaust passage outlets being formed between the baffles and the base panels.

12. An apparatus as claimed in claim 9 further comprising an annular segmented stator shroud attached to the outer casing and the shroud circumscribing radial outer blade tips of turbine blades of a turbine rotor.

13. An apparatus as claimed in claim 12 further comprising:

the two thermal control rings being forward and aft rings respectively, the annular spray tubes being arcuate segments and closed and sealed at circumferential ends of the spray tubes, the annular spray tubes including at least first, second, and third spray tubes, the first spray tube located axially forward of the forward thermal control ring, the second spray tube located axially between the forward and aft thermal control rings, and the third spray tube located axially aft of the aft thermal control ring.

14. An apparatus as claimed in claim 13 further comprising:

the annular segmented stator shroud including shroud segments mounted by forward and aft shroud hooks to an annular segmented shroud support, the annular segmented shroud support attached to the outer casing by forward and aft case hooks.

15. An apparatus as claimed in claim 14 further comprising:

the header assemblies including base panels, headers connected to the supply tube and attached to radially outer sides of the base panels forming the plenums therebetween, first panel holes disposed through the base panels forming inlets for the thermal control air to flow from the plenums to the plurality of spray tubes, and baffles brazed or otherwise attached to radially outwardly facing surfaces of the base panels.

16. An apparatus as claimed in claim 15 further comprising the baffles being contoured to form the exhaust passages between the baffles and base panels of the distribution manifold.

17. An apparatus as claimed in claim 16 further comprising the exhaust passages having exhaust passage inlets formed by radially facing exhaust holes through the baffles and circumferentially facing exhaust passage outlets formed between the baffles and the base panels.

18. A method for exhausting thermal control air comprising spraying thermal control air on at least one thermal control ring attached to an outer casing and/or onto the outer casing with spray tubes having spray holes in an annular region between the outer casing and a distribution manifold encircling an axially extending portion of the casing and then circumferentially exhausting the thermal control air through circumferentially facing exhaust passage outlets of circumferentially extending exhaust passages.

19. A method as claimed in claim 18 wherein the circumferentially exhausting the thermal control air further comprises flowing the thermal control air through the exhaust passages formed between baffles and base panels of the distribution manifold wherein the baffles are attached to base panels of the distribution manifold and contoured to form the exhaust passages between the baffles and the base panels.

20. A method as claimed in claim 19 wherein the flowing the thermal control air through exhaust passages further comprises: flowing the thermal control air into the exhaust passages through exhaust passage inlets of the exhaust passages formed by radially facing exhaust holes through the baffles, then flowing the thermal control air through the exhaust passages, and then flowing the thermal control air out of the exhaust passages through the circumferentially facing exhaust passage outlets formed between the baffles and the base panels.

* * * * *